US012109822B2

(12) United States Patent
Bas Ferrer

(10) Patent No.: US 12,109,822 B2
(45) Date of Patent: Oct. 8, 2024

(54) TEXTILE PRINTING SERVICING OPERATIONS

(71) Applicant: Hewlett-Packard Development Company, L.P., Spring, TX (US)

(72) Inventor: Jordi Bas Ferrer, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 309 days.

(21) Appl. No.: 17/634,202

(22) PCT Filed: Sep. 9, 2019

(86) PCT No.: PCT/US2019/050174
§ 371 (c)(1),
(2) Date: Feb. 9, 2022

(87) PCT Pub. No.: WO2021/050036
PCT Pub. Date: Mar. 18, 2021

(65) Prior Publication Data
US 2022/0325470 A1 Oct. 13, 2022

(51) Int. Cl.
*B41J 2/21* (2006.01)
*B41J 2/165* (2006.01)
(Continued)

(52) U.S. Cl.
CPC ......... *B41J 2/2114* (2013.01); *B41J 2/16526* (2013.01); *B41J 2/2117* (2013.01); *B41J 3/4078* (2013.01); *B41J 11/0015* (2013.01); *B41M 5/0011* (2013.01); *B41J 2/16505* (2013.01); *B41J 2/16529* (2024.05); *B41J 3/407* (2013.01)

(58) Field of Classification Search
CPC .... B41J 2/2114; B41J 2/16526; B41J 2/2117; B41J 3/4078; B41J 11/0015; B41J 2/16505; B41J 3/407; B41J 2002/16529; B41M 5/0011; D06P 5/002; D06P 5/30
See application file for complete search history.

(56) References Cited

U.S. PATENT DOCUMENTS 7,134,749 B2 11/2006 Ben-Zur et al.
8,287,066 B2 10/2012 Jackson
(Continued)

FOREIGN PATENT DOCUMENTS

CN 105339178 A 2/2016
CN 106042658 B 9/2017
(Continued)

OTHER PUBLICATIONS

International Search Report dated Feb. 6, 2020, issued in PCT/US2019/050174, filed Sep. 9, 2019 (2 pages).

*Primary Examiner* — Henok D Legesse
(74) *Attorney, Agent, or Firm* — Jordan IP Law, LLC

(57) ABSTRACT

It is hereby disclosed a textile printing method comprising a controller to: receive a print job; and determine a print area of a garment based on the print job; wherein the controller is to instruct a printhead comprising a pre-treatment liquid to eject a pre-treatment liquid in a pre-treatment area of the garment being the pre-treatment area associated to the print area; and to instruct a printhead comprising printing fluid to print the print job on the print area.

12 Claims, 3 Drawing Sheets

(51) Int. Cl.

| | |
|---|---|
| ***B41J 3/407*** | (2006.01) |
| ***B41J 11/00*** | (2006.01) |
| ***B41M 5/00*** | (2006.01) |

(56) References Cited

U.S. PATENT DOCUMENTS

| | | | | |
|---|---|---|---|---|
| 9,533,491 | B1 | 1/2017 | Lefevre et al. | |
| 9,550,374 | B1 | 1/2017 | Marino et al. | |
| 9,757,941 | B2 | 9/2017 | Gracia Verdugo et al. | |
| 2002/0060728 | A1 | 5/2002 | Koizumi et al. | |
| 2003/0063151 | A1* | 4/2003 | Bauer .................. | B41J 2/16526 347/35 |
| 2004/0252173 | A1* | 12/2004 | Ben-Zur ................ | B41J 3/4078 347/101 |
| 2007/0057983 | A1 | 3/2007 | Kawaguchi et al. | |
| 2007/0104899 | A1 | 5/2007 | Pearl et al. | |
| 2010/0091052 | A1 | 4/2010 | Ogawa et al. | |
| 2010/0293725 | A1 | 11/2010 | Hermann | |
| 2013/0050322 | A1* | 2/2013 | Vall ........................ | B41J 29/393 347/14 |
| 2013/0076814 | A1 | 3/2013 | Kanaya et al. | |
| 2014/0063093 | A1* | 3/2014 | Weissman ............ | B41J 2/16523 347/35 |
| 2014/0210900 | A1* | 7/2014 | Ohashi ................. | C09D 11/322 347/20 |
| 2015/0251411 | A1 | 9/2015 | Rossell et al. | |
| 2015/0251447 | A1 | 9/2015 | Sayama et al. | |
| 2017/0253054 | A1 | 9/2017 | Hamada | |
| 2017/0298247 | A1 | 10/2017 | Steert et al. | |
| 2019/0224975 | A1 | 7/2019 | Ito et al. | |
| 2019/0234015 | A1 | 8/2019 | Chidate et al. | |
| 2020/0131390 | A1* | 4/2020 | Sakuma ............... | C07D 251/50 |

FOREIGN PATENT DOCUMENTS

| | | | |
|---|---|---|---|
| JP | 2005-320663 | A | 11/2005 |
| JP | 2007-076156 | A | 3/2007 |
| JP | 5177868 | B2 | 4/2013 |
| JP | 2015-168901 | A | 9/2015 |
| JP | 2017-159472 | A | 9/2017 |
| JP | 2019-018502 | A | 2/2019 |
| JP | 2019-131919 | A | 8/2019 |
| WO | WO-2014039306 | | 3/2014 |

* cited by examiner

TEXTILE PRINTING SERVICING OPERATIONS

CLAIM FOR PRIORITY

The present application is a national stage filing under 35 U.S.C 371 of PCT application number PCT/US2019/050174, having an international filing date of Sep. 9, 2019, the disclosure of which is hereby incorporated by reference in its entirety.

BACKGROUND

Textile printing is a growing field of technology wherein standard printers have a lower efficiency due to the particularities of textiles. Such particularities add further complexity to a printing system in case the user intends to print (i.e., deposit a printing fluid) directly onto a garment given the added complexity of dealing with different sizes, shapes, and materials of such garments.

In some textiles, an application of pre-treatment liquid may help in providing better washfastness of the printed textile. The application of such pre-treatment liquid as part of an in-line printing process provides for an advantage in printing cost, quality and/or speed.

BRIEF DESCRIPTION OF THE DRAWINGS

Various example features will be apparent from the detailed description which follows, taken in conjunction with the accompanying drawings, wherein.

DETAILED DESCRIPTION

Figure 1:
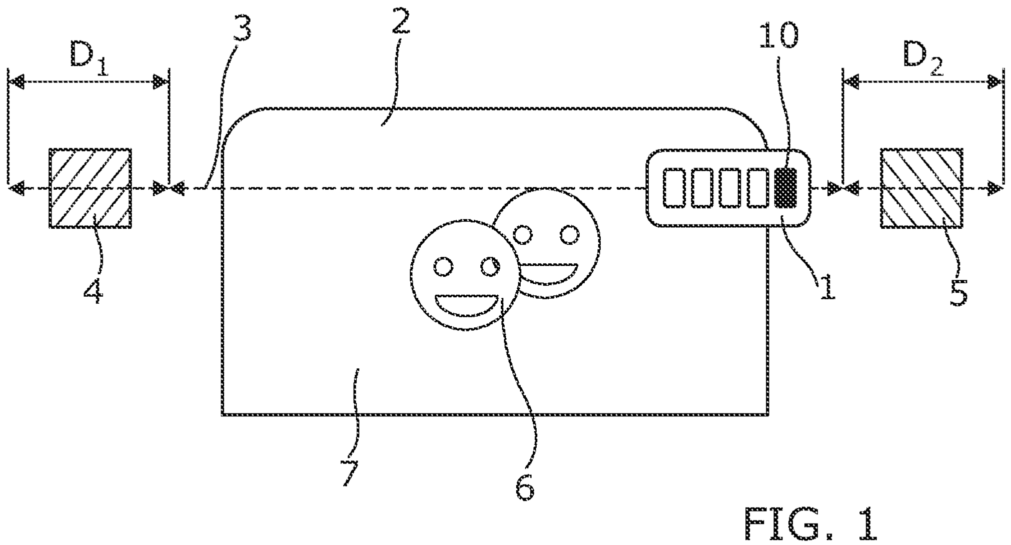
FIG. 1 is a schematic top view of a textile printer while printing a textile according to an example.

An example of a textile printer may be an inkjet printer. Inkjet printers are, in general terms, controllable fluid ejection devices, (i.e., printheads) that propel droplets of printing fluid from a nozzle to form an image on a substrate wherein such propelling can be achieved by different technologies such as, e.g., thermal injection or piezo injection.

In an example; an inkjet printer may comprise several printheads wherein some of the nozzles may be configured to apply pre-treatment liquid onto the textile. Pre-treatment liquids are commonly printed over, under, or both over and under inks to bond them to the printed medium and/or to increase washfastness. In an example; pre-treatment liquids may bind charged dyes with oppositely charged species. For example, a suitably charged agent (e.g., a cationic polymer) in the pre-treatment fluid can immobilize an oppositely charged dye (e.g., an anionic dye) in the ink through electrostatic interactions.

Pre-treatment fluids known as underprint fluids are deposited on the substrate before the marking fluid, and preferably substantially only in areas subsequently printed with a marking fluids, e.g.; a colored ink. The area covered by the pre-treatment fluid (pre-treatment area) need not, however, entirely fill the area printed with marking fluid, i.e., the print area. Also, the ink need not fall (entirely) on top of the pre-treatment liquid. The pre-treatment area can be substantially less than the print area, however, in some examples the print area may be comprised within the pre-treatment area.

In textile printing in particular, having a printer that allows for depositing both, a pre-treatment fluid and a marking fluid, in the same process is substantially advantageous.

Furthermore, inkjet printers may incorporate servicing operations to prevent possible failures in the nozzles, e.g., clogging which is typically performed in service areas to avoid creating artifacts in a printed textile. In-line pre-treatment liquid application may aid in providing a broader area to perform such servicing operations.

In the following description and figures, some example implementations of print apparatus, print systems, and/or printers are described. In examples described herein, a "printer" or a "printing system" may be a device to print content on a physical medium (e.g., textiles) with a print material (e.g., ink or toner). For example, the printer may be a wide-format print apparatus that prints latex-based print fluid on a print medium, such as a print medium that is size A2 or larger. The physical medium printed on may be a garment such as, e.g., a shirt, a cap or the like.

The present disclosure relates to a textile printing method comprising a controller to:

receive a print job; and determine a print area of a garment based on the print job;

wherein the controller is to instruct a printhead comprising a pre-treatment liquid to eject the pre-treatment liquid in a pre-treatment area of the garment being the pre-treatment area associated to the print area; and to instruct a printhead comprising printing fluid to print the print job on the print area. In an example, the pre-treatment area contains the print area as to ensure that the entirety of the printing fluid interacts with pre-treatment fluid.

In an example, the controller is further to apply an opaque fluid at least partly within the print area and to apply the printing fluid over the opaque fluid.

Further, the controller may instruct a printhead to perform servicing routines in a servicing area wherein the servicing area excludes the pre-treatment area. The servicing area may, in a further example, be within an area complementary to the pre-treatment area. As for the servicing routine, such routine may include spit-on-page routines.

In an example, the textile to be printed on the above-mentioned method is a dark textile, i.e., a garment with a lightness below 50 according to CIELAB color space.

Furthermore, it is hereby disclosed a textile printer that comprises:

a set of marking printheads being each marking printhead to eject a marking fluid towards a garment;

a set of pre-treatment printheads being each pre-treatment printhead to eject a pre-treatment liquid towards the garment; and a controller to receive a print job and control the set of marking printheads and the set of pre-treatment printheads;

wherein the controller is to receive a print job and define, on the garment, a pre-treatment area on and a print area based on the print job being the print area contained in the pre-treatment area, and wherein the controller is to instruct the pre-treatment printheads to eject pre-treatment liquid on the pre-treatment area and to instruct the marking printheads to eject marking fluid on the print area.

In an example, the controller is further to define a service area on the garment, wherein the service area excludes the pre-treatment area and wherein the controller instructs the marking printheads to perform a servicing operation in the service area.

Furthermore, the servicing operation may, in an example, include ejecting drops of marking fluid on the service area.

In a further example, the controller is further to define a service area on the garment, wherein the service area excludes the pre-treatment area and wherein the controller instructs the pre printheads to perform a servicing operation in the service area. The servicing operation may include, e.g., spit-on-page servicing.

Also, it is disclosed a non-transitory machine-readable medium storing instructions executable by a controller, the medium storing instructions to control a textile printer, being the controller to:

receive a print job; and determine a print area of a garment based on the print job; wherein the controller is further to instruct a printhead comprising a pre-treatment liquid to eject the pre-treatment liquid in a pre-treatment area of the garment being the pre-treatment area associated to the print area; and to instruct a printhead comprising printing fluid to print the print job on the print area.

In an example, the medium may store instructions to define, by the controller, a servicing operation to be performed on a servicing area which does not overlap the pre-treatment area.

FIG. 1 schematically illustrates a printer having a print engine that, in an example, is a scanning carriage 1 that moves along a print direction 3 as to eject printing liquid towards a textile 2 for generating an image therein.

In other examples, the print engine may comprise a printbar having a plurality of nozzles that span the width of the textile 2. The nozzles are arranged to eject ink drops onto the textile 2 as the textile 2 is advanced through the printer apparatus. This configuration is known as page-wide array or page-wide printer.

While printing on textiles, especially directly onto a garment, pre-treatment liquids may be applied to the textile to improve the binding between the printing fluid and the textile. In the example provided in FIG. 1, the carriage 1 comprises a set of printhead wherein one of such printheads is fed with pre-treatment liquid, such printhead will be referred to in the foregoing as the pre-treatment printhead 10. Other printheads of the set of printheads comprise marking liquids, for example, Cyan, Magenta, Yellow and Black inks. In a further example, a printhead is provided with an opaque fluid, e.g., White ink.

In the example of FIG. 1, the carriage 1 being provided with a pre-treatment print-head 10, allows for inline deposition of pre-treatment which has as advantage of a more controlled deposition of the printing fluid, e.g., a better dosage of the amount of pre-treatment fluid being used. In an example, the amount of pre-treatment fluid and the areas in which printing fluid is deposited is defined by a controller based on the print job to be printed.

In the case of scanning printheads, the carriage 1 may reciprocate across the textile 2 as the media advances in a direction perpendicular to the print direction 3. In some applications, some of the printheads may remain without ejecting printing fluid for prolongated periods which may causes issues such as, e.g., clogging due to printing fluid located around the nozzle area in contact with air which may solidify during inactivity periods.

A mechanism to mitigate nozzle clogging may be providing a spittoon 4, 5 to the printer 1. The spittoon 5 allows for spitting of nozzles onto a spitting surface that may have the capability to absorb waste ink. In an example, the spitting surface is a foam collecting spittoon 40, 50, such spittoon may be passive and potentially user replaceable after a certain amount of fluids has been deposited. In a further example, the spitting surface comprises a suction, filtering, or collection system, e.g., by a system able to collect waste fluids into an offline container.

A further mechanism to mitigate nozzle clogging is adding a spit-on-page routine in a controller. Spit-on-page is a technique in which small droplets of printing fluid are spat towards the surface on which a print is to be performed but such droplets are of a small size and are spaced such that they are not visible to a human eye. Such mechanism is effective in the sense in that the printer does not have to wait until the carriage reaches a service area to perform a spitting operation which is particularly relevant for large-format printers in which the width of the media may be A2 size or even wider, e.g., around 128 inches (3.25 meters).

The use of spit-on-page routines may also aid in reducing the width of the printer since, including spittoons 4, 5 on both sides of the printer represents that the width of the printer is increased, at least, by distances $D_1$ and $D_2$ as shown in FIG. 1. Spit-on-page may replace the use of spittoons, reduce their size or reduce the number of spittoons in a printer, either of which may aid in reducing the size of the printer.

In an example, the printer may comprise a controller that receives a print job to be reproduced in a textile and, based on the print job, define areas of the textile on which pre-treatment fluid is needed, i.e., define a pre-treatment area 6. The pre-treatment area 6 can be an area of the textile on which the print job requires the deposition of marking fluid, i.e., a printing area that may be defined, e.g., as an area on which an ink such as a Cyan, Magenta, Yellow, Black or, even, White ink is to be deposited.

Moreover, the controller may identify areas within the textile wherein servicing operations may be performed without having much of on an impact in the quality of the print, for example, the controller may identify a servicing area wherein spitting operations may be performed such as spit-on-page routines.

In an example, the controller may identify a service area 7 which may be, e.g., the areas wherein a pre-treatment fluid has not (or will not) be applied. The controller may then define servicing routines to be performed on the spittoon, on the service area 7 or in both of them.

Also, the pre-treatment area may be different from the print area. In an example, the print area may comprise the pre-treatment area, e.g., to avoid visible effects that may be caused by the pre-treatment liquid, e.g., a glossy effect. In other examples, the pre-treatment area may comprise the print area in order to ensure that all printing fluid ejected towards the textile interacts with printing fluid. An example wherein the print area does not correspond to the pre-treatment area as will be explained in further detail below with reference to FIG. 2.

Figure 2:
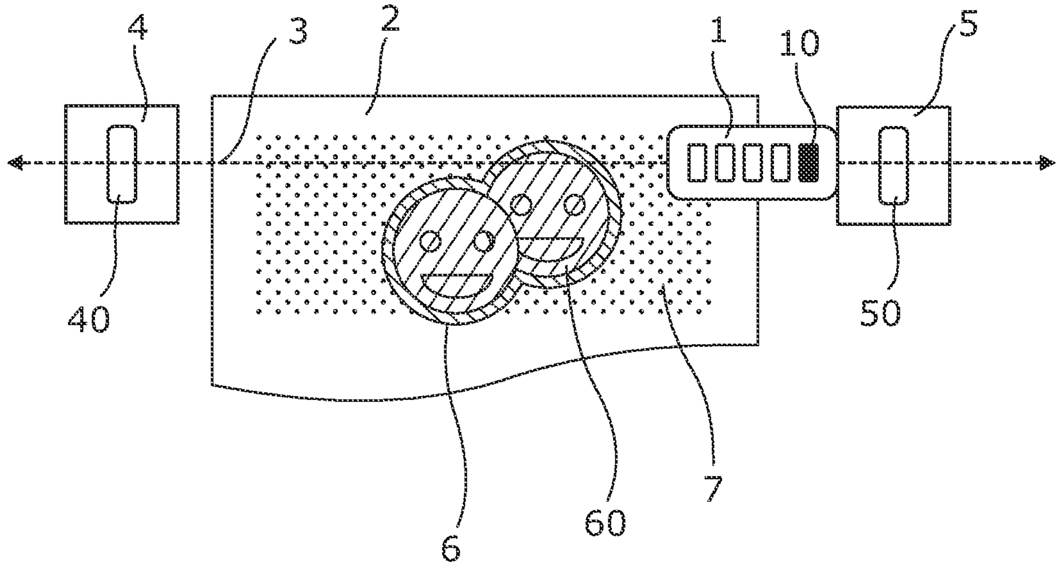
FIG. 2 is a schematic top view of a textile printer while printing a textile according to a further example.

FIG. 2 depicts an example wherein the printing system is provided with spittoons 4, 5 at both sides of the printer and wherein each spittoon 4, 5 comprises a spitting area 40, 50 that may comprise, e.g., a foam to absorb printing fluid used during servicing operations.

As shown in FIG. 2, the controller may assign a print area 60 that corresponds to the area wherein marking fluid is to be deposited and that also corresponds to an image to be printed in the textile 2. Further, the controller may assign a pre-treatment area 6 that may be associated to the print area 60, e.g., enclosing the print area 60 to ensure that the entirety of the marking fluid interacts with pre-treatment fluid. In an alternative embodiment, the pre-treatment area may be slightly smaller than the print area so that the print area covers the entirety of the pre-treatment area thereby avoiding any possible visible effects that may be caused by the pre-treatment fluid.

Further, the controller may assign a service area 7 which may be, e.g., an area complementary to the pre-treatment area 6. In this manner, the printing fluid that is ejected in a servicing operation performed in the service area does not interact with the pre-treatment fluid and, therefore, is less likely to be visible in the finished textile or, at least, will have less washfastness capabilities and may be, at least, partially removed or be less visible in a post-processing operation, e.g., washing the textile or heating it.

In an example, the controller receives a print job from a user and it determines, based on the print job, the print area, performs an operation on the print area (e.g., by expanding or shrinking the print area by a determined amount) and, also calculates the service area as the area complementary to the pre-treatment area. In another example, the pre-treatment area and the print are the same.

Figure 3:
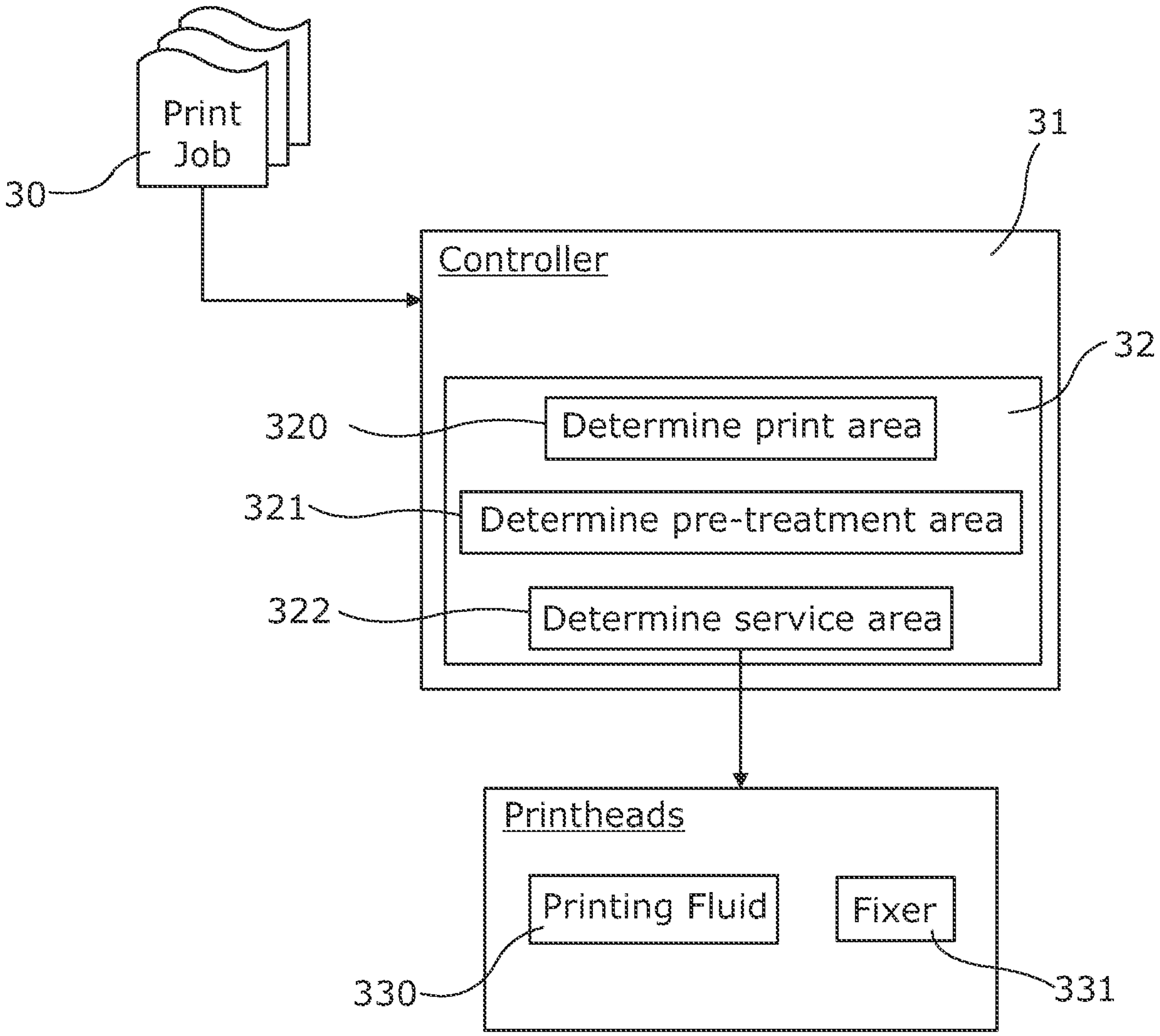
FIG. 3 shows the elements of a controller for a textile printer according to an example.

FIG. 3 shows a controller 31 and its associated elements according to an example. In FIG. 3 the controller 31 may have access to a print job 30, e.g., by receiving it from a user through access to a memory device containing the print job 30. Upon receipt of the print job 30, the controller 31 may perform operations as to translate image data to a print data that will be sent to the printheads. In particular, the controller 31 determines a print area 320, determine a pre-treatment area that, as mentioned above, may be identical to the print area and, also, will determine a service area 322 that may be complementary to the pre-treatment area or, at least, may be an area that does not overlap with the pre-treatment area.

Once these areas are determined, the controller is to instruct the printheads to perform the printing operation by, ejecting a pre-treatment fluid such as a fixer 331 on the pre-treatment area and eject the printing fluid corresponding to the print job 30 on the print area and over the pre-treatment fluid. In some embodiments, the pre-treatment fluid may be ejected over the print area over the printing fluid. Also, in the embodiment in which the printer is multi-pass scanning printhead, the pre-treatment fluid and the printing fluid may be ejected in the same pass.

In an example, such as when dark textiles are to be printed on, the controller may comprise an intermediate step of ejecting opaque printing fluid such as a white ink between the pre-treatment fluid and the marking fluid on an area associated to the print area as an undercolor, i.e., printing between the pre-treatment fluid and the printing fluid. This helps achieve a better color accuracy while printing on dark textiles, i.e., textiles with a lightness below fifty in L*a*b color space.

Figure 4A:
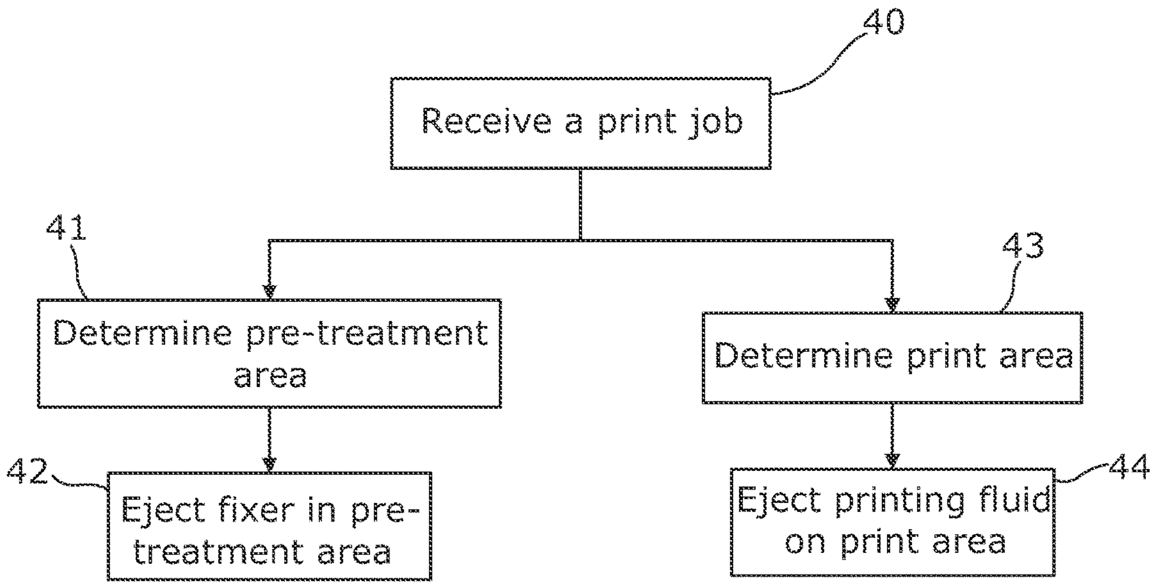
FIG. 4A shows an example of a method for printing a textile.

FIG. 4A discloses a method according to an example. In the method of FIG. 4A, the printer may receive a print job 40, for example, by a user selecting an image or any print content.

Subsequently, a controller may be to perform operations to translate the image from the digital world to an image to be printed on a textile. As part of this process the controller may determine a pre-treatment area 41 wherein pre-treatment fluid should be applied and a print area 43 wherein print fluid or marking fluids are to be applied.

Then, once the areas are defined, the printing process starts and the controller is to instruct the printheads to eject, e.g., fixer a pre-treatment fluid 42 when the pre-treatment printhead is at the pre-treatment area and, over the pre-treatment, the controller may instruct the printheads with marking fluid to eject printing fluid on the print area 44.

Figure 4B:
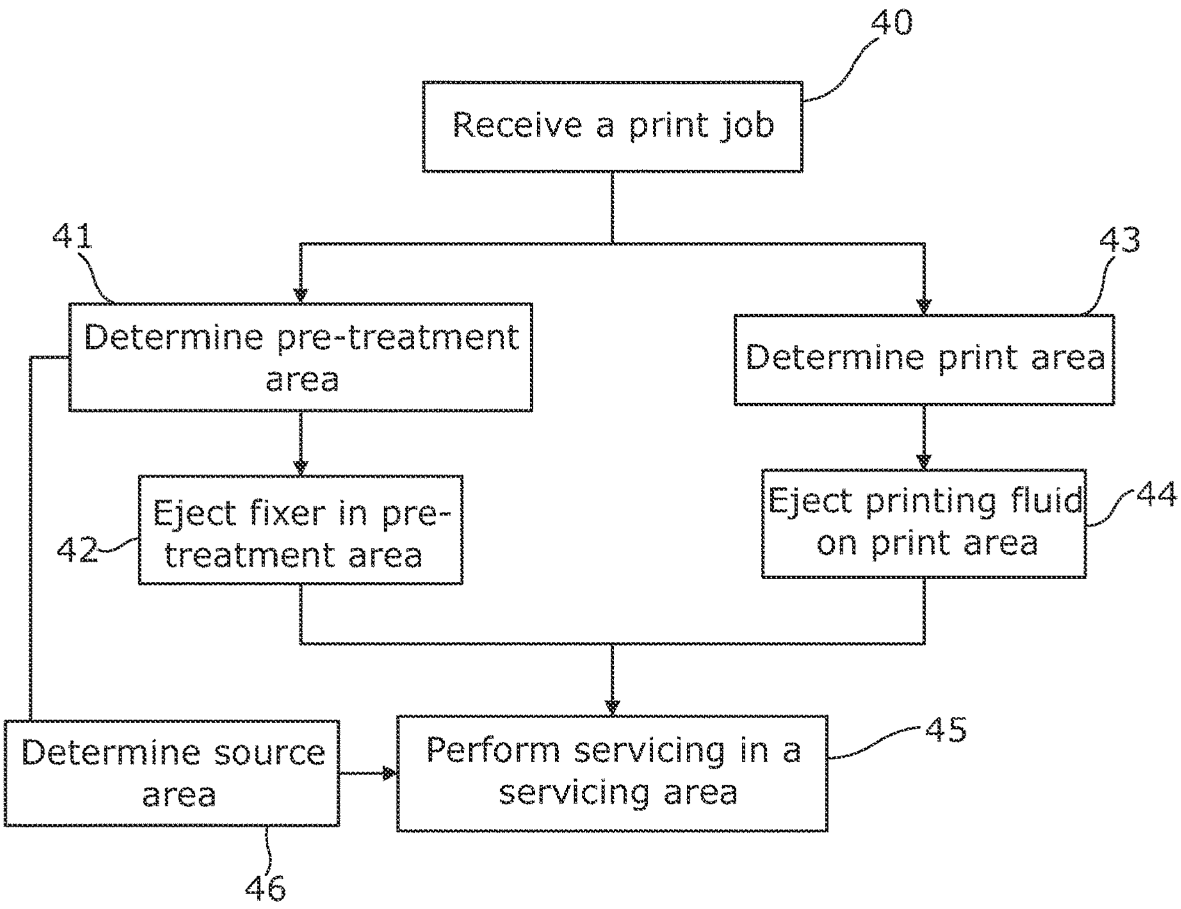
FIG. 4B shows a further example of a method for printing a textile.

FIG. 4B shows a variation of the method of claim 4A wherein the controller may be also to determine a service area 46 based on the print job information and, in that case, the controller may also be configured to instruct nozzles to perform servicing operations 45 while they are not located over areas on which a pre-treatment fluid has been applied. As mentioned above, the service area 46 may be determined by performing operations on the pre-treatment area or the print area to ensure that servicing is not performed in areas in which: i) there is printing fluid; or, ii) there is pre-treatment fluid.

In any of the above-mentioned examples, the printer may be provided with a controller and the controller may be coupled to the conveyor and the print engine as to control their operations. The controller may be a combination of circuitry and executable instructions representing a control program to perform the above-mentioned operations.

Further, some examples of controllers may be provided into a non-transitory machine-readable storage medium encoded with instructions executable by a processing resource of a computing device to perform methods described herein.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teachings. It is to be understood that any feature described in relation to any one example may be used alone, or in combination with other features described, and may also be used in combination with any features of any other of the examples, or any combination of any other of the examples.

The invention claimed is:

1. A textile printing method comprising:
- receiving a print job;
- determining a print area of a garment based on the print job;
- instructing a printhead comprising a pre-treatment liquid to eject the pre-treatment liquid in a pre-treatment area of the garment associated to the print area;
- instructing a printhead comprising printing fluid to print the print job on the print area;
- determining a servicing area of the garment based on the pre-treatment area such that a size of the servicing area is based on the size of the pre-treatment area; and
- instructing the printhead comprising printing fluid to perform spitting routines in the servicing area exclusive of the pretreatment area.

2. The method of claim 1 wherein pre-treatment area contains the print area.

3. The method of claim 1 wherein the controller is further to apply an opaque fluid at least partly within the print area and to apply the printing fluid over the opaque fluid.

4. The method of claim 1, wherein the servicing area is within an area complementary to the pre-treatment area.

5. The method of claim 1 wherein the textile is a dark textile.

6. The method of claim 5 wherein the dark textile is a textile with a lightness below 50 according to CIELAB color space.

7. The method of claim 1, wherein the garment is a shirt or a cap.

8. A textile printer that comprises:

a set of marking printheads, wherein each marking printhead ejects a marking fluid towards a garment;

a set of pre-treatment printheads, wherein each pre-treatment printhead ejects a pre-treatment liquid towards the garment; and a controller to receive a print job and control the set of marking printheads and the set of pre-treatment printheads;

wherein the controller is to receive a print job and define, on the garment, a pre-treatment area and a print area based on the print job wherein the controller is to instruct the pre-treatment printheads to eject pre-treatment liquid on the pre-treatment area and to instruct the marking printheads to eject marking fluid on the print area, wherein the controller is to define a servicing area on the garment based on the pre-treatment area such that a size of the servicing area is based on the size of the pre-treatment area, and wherein the controller instructs the marking printheads to perform a servicing operation in the service area.

9. The printer of claim 8 wherein the servicing operation includes ejecting drops of marking fluid on the service area.

10. The printer of claim 8 wherein the servicing operation includes spit-on-page servicing.

11. A non-transitory machine-readable medium storing instructions executable by a controller, the medium storing instructions to control a textile printer to:

receive a print job;

determine a print area of a garment based on the print job;

instruct a printhead comprising a pre-treatment liquid to eject the pre-treatment liquid in a pre-treatment area of the garment associated to the print area;

instruct a printhead comprising printing fluid to print the print job on the print area;

determining a servicing area of the garment based on the pre-treatment area such that a size of the servicing area is based on the size of the pre-treatment area; and instructing the printhead comprising printing fluid to perform spitting routines in the servicing area exclusive of the pretreatment area.

12. The non-transitory machine-readable medium of claim 11, wherein the garment is a shirt or a cap.

* * * * *